(12) United States Patent
Jones et al.

(10) Patent No.: US 10,535,039 B2
(45) Date of Patent: Jan. 14, 2020

(54) SYSTEMS AND METHODS FOR DETERMINING STOCKING LOCATIONS OF PRODUCTS HAVING MORE THAN ONE STOCKING LOCATION ON A SALES FLOOR

(71) Applicant: Walmart Apollo, LLC, Bentonville, AR (US)

(72) Inventors: Nicholaus A. Jones, Fayetteville, AR (US); Robert J. Taylor, Rogers, AR (US); Matthew A. Jones, Bentonville, AR (US); Aaron J. Vasgaard, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 132 days.

(21) Appl. No.: 15/678,450

(22) Filed: Aug. 16, 2017

(65) Prior Publication Data

US 2018/0053145 A1 Feb. 22, 2018

Related U.S. Application Data

(60) Provisional application No. 62/377,049, filed on Aug. 19, 2016.

(51) Int. Cl.
*G06Q 10/08* (2012.01)

(52) U.S. Cl.
CPC .................. *G06Q 10/087* (2013.01)

(58) Field of Classification Search
USPC .......................................................... 705/28
See application file for complete search history.

(56) References Cited

U.S. PATENT DOCUMENTS

| 8,190,497 | B2 | 5/2012 | O'Dell et al. |
| 8,800,869 | B2 | 8/2014 | Waters |
| 2001/0034673 | A1* | 10/2001 | Yang ................ G06Q 10/06311 |
| | | | 705/28 |
| 2003/0036985 | A1 | 2/2003 | Soderholm |
| 2003/0088442 | A1 | 5/2003 | Michael |

(Continued)

OTHER PUBLICATIONS

PCT; App. No. PCT/US2017/047345; International Search Report and Written Opinion dated Oct. 27, 2017.

*Primary Examiner* — Garcia Ade
(74) *Attorney, Agent, or Firm* — Fitch, Even, Tabin and Flannery LLP

(57) ABSTRACT

In some embodiments, methods and systems for determining stocking locations of products having more than one stocking location on a sales floor of a retail facility include an electronic inventory management database that stores product identification data indicating an identify of one or more products at the retail facility and product location data indicating a stocking location of the products on the sales floor of the retail facility. An electronic inventory management device including a processor-based control circuit is configured to correlate the product identification data and the product location data stored in the electronic inventory management database, determine that one or more products are stocked in first and second stocking locations on the sales floor of the retail facility, track worker task events associated with the products, and determine whether the product is to be stocked or was stocked at the first or second stocking location.

20 Claims, 3 Drawing Sheets

(56) References Cited

U.S. PATENT DOCUMENTS

| | | | |
|---|---|---|---|
| 2005/0149414 A1* | 7/2005 | Schrodt | G06Q 10/087 705/29 |
| 2007/0035380 A1 | 2/2007 | Overhultz | |
| 2009/0195384 A1 | 8/2009 | Amidi | |
| 2013/0037613 A1* | 2/2013 | Soldate | G06Q 10/087 235/385 |
| 2013/0173435 A1 | 7/2013 | Cozad | |
| 2014/0201042 A1 | 7/2014 | Meyer | |
| 2014/0266616 A1 | 9/2014 | Jones | |
| 2015/0363742 A1 | 12/2015 | Lee | |

* cited by examiner

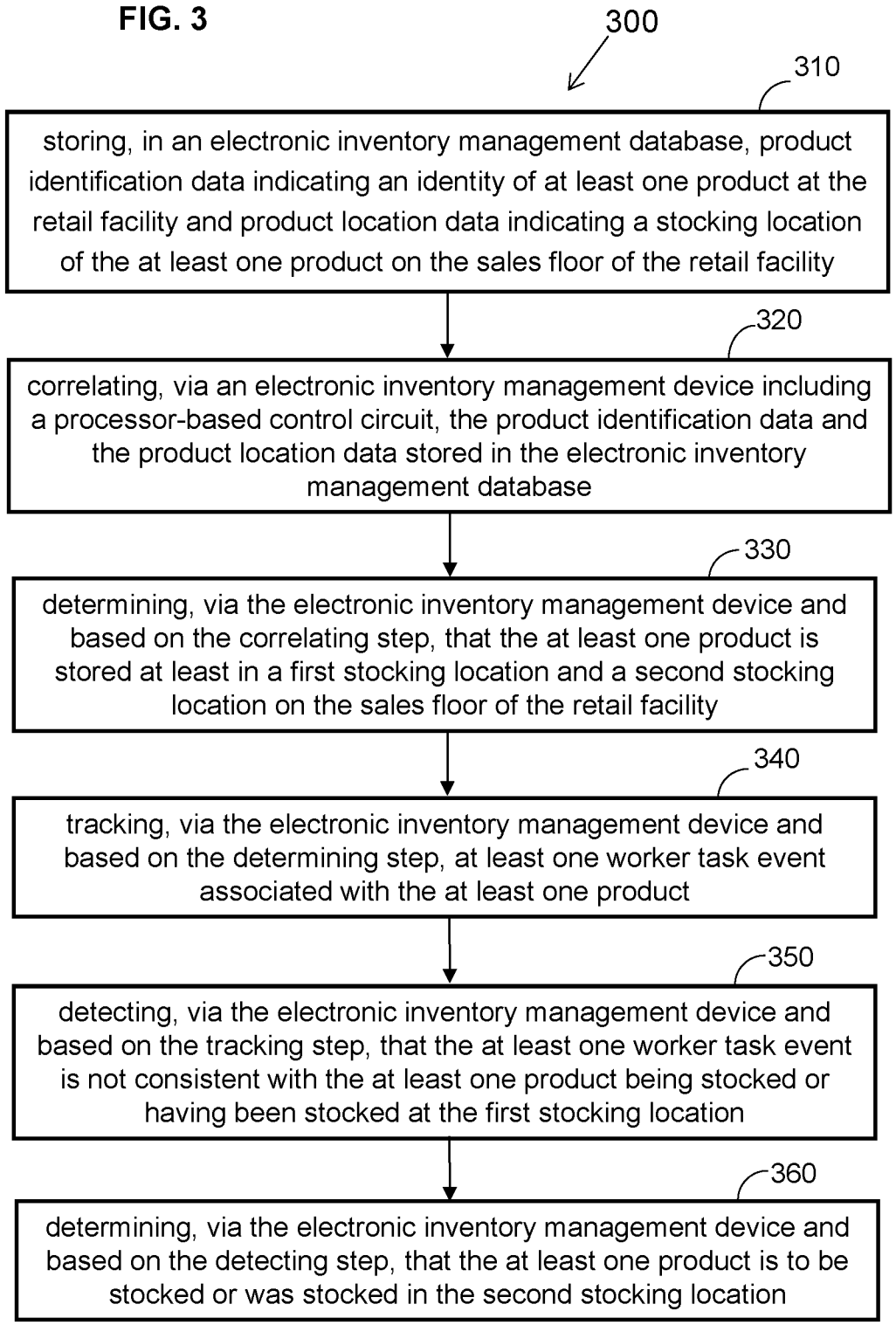

SYSTEMS AND METHODS FOR DETERMINING STOCKING LOCATIONS OF PRODUCTS HAVING MORE THAN ONE STOCKING LOCATION ON A SALES FLOOR

CROSS-REFERENCE TO RELATED APPLICATION

This application claims the benefit of U.S. Provisional Application No. 62/377,049, filed Aug. 19, 2016, which is incorporated herein by reference in its entirety.

TECHNICAL FIELD

This disclosure relates generally to managing inventory at retail sales facilities and, in particular, to systems and methods for determining stocking locations of products having more than one stocking location on a sales floor of a retail facility.

BACKGROUND

Retail facilities (e.g., large department stores) often display products in more than one location on the sales floor. For example, a product may be displayed to customers on a shelf at its primary stocking location on the sales floor, but also simultaneously at a secondary stocking location such as a feature display designed to attract customers' attention to the product. When a product is sold at the point of sale device (e.g., sale register) on the sales floor, the scanning of the product at the point of sale device does not indicate whether the product purchased by the customer was taken by the customer from the primary stocking location of the product or from the secondary stocking location of the product. A corollary problem that occurs is that workers at the retail facility tasked with bringing a product to replenish the stocking location on the sales floor generally do not know that this product is displayed on the sales floor at a primary stocking location and at a secondary stocking location, or whether the product is being brought to replenish the primary stocking location or to replenish the secondary display location.

When workers at a retail facility, who do not know whether a product is being brought to the sales floor to replenish the stock at the primary stocking location or the secondary stocking location, arrive at the primary stocking location of the product on the sales floor with one or more replenishment products only to see that the primary stocking location does not have available space for the replenishment products, the workers are forced to bring the replenishment product to the secondary stocking location after having made an unnecessary trip with the replenishment product to the primary stocking location, which is inefficient. If, on the other hand, workers at the retail facility, who do not know that the replenishment product being brought onto the sales floor is also being displayed to customers at a second stocking location, arrive at the primary stocking location of the product on the sales floor with one or more replenishment products only to see that the primary stocking location does not have available space for the replenishment products, the workers often assume that the replenishment request for the product was erroneous and return the replenishment products to the stock room to be re-binned. As a result, the replenishment products brought out onto the sales floor to replace the products that were sold to consumers from the secondary stocking location do not end up being stocked at the second stocking location to replenish the stock depleted due to sales. Instead, the replenishment products end up being returned by the workers back to the stock room of the retail facility, while empty spaces allotted for these products continue to exist on the sale floor, undesirably leading to possible lost sales and loss of revenue for the retail sales facility.

BRIEF DESCRIPTION OF THE DRAWINGS

Disclosed herein are embodiments of systems, devices, and methods pertaining to determining stocking locations of products having more than one stocking location on a sales floor of a retail facility. This description includes drawings, wherein:

FIG. 3 is a flow diagram of a process of for determining stocking locations of products having more than one stocking location on a sales floor of a retail facility in accordance with some embodiments.

Figure 1:
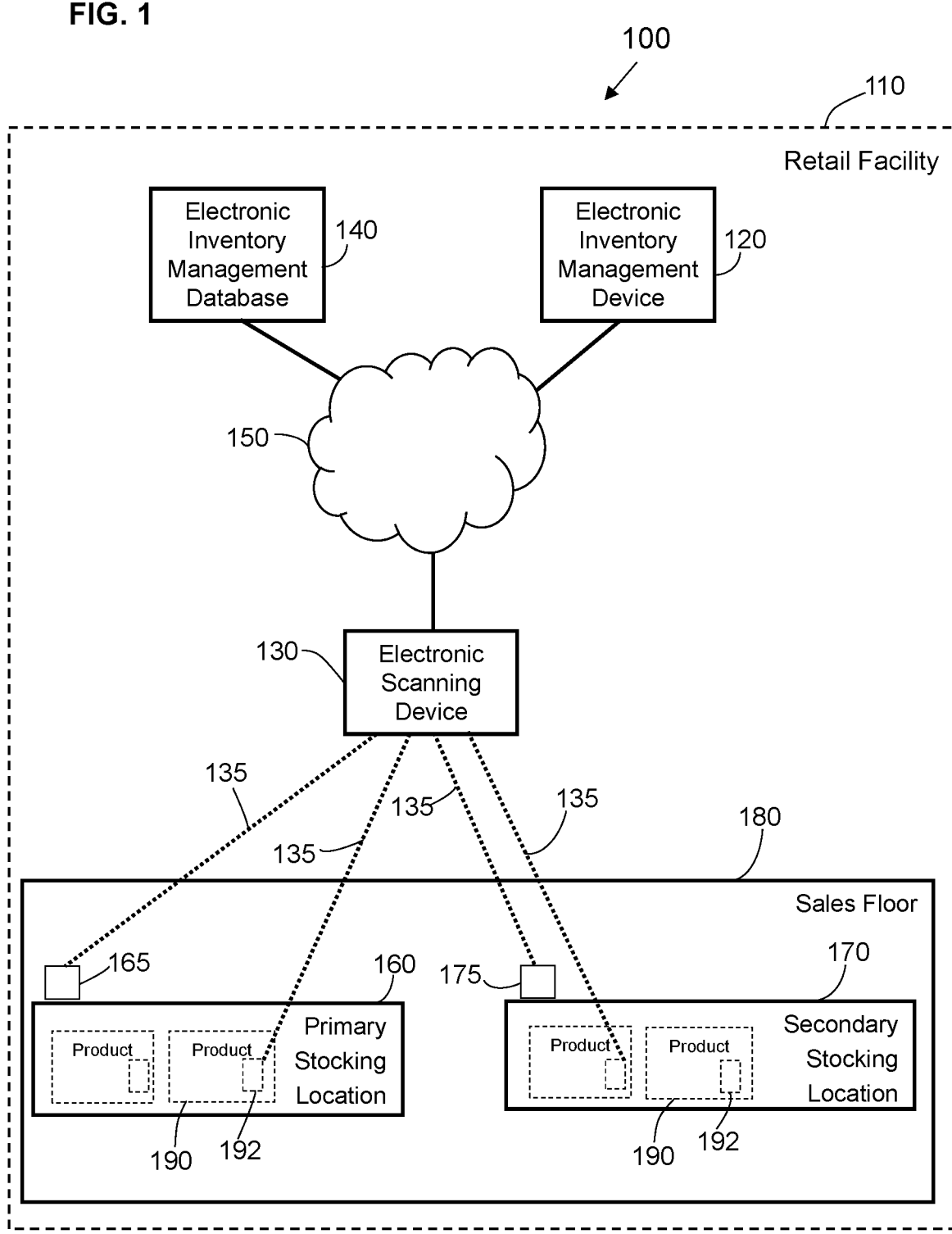
FIG. 1 is a diagram of a system for determining stocking locations of products having more than one stocking location on a sales floor of a retail facility in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein provide for determining stocking locations of products having more than one stocking location on a sales floor of a retail facility based on storing product identification data and product location data, correlating the product identification data and the product location data, tracking worker task events associated with the products, and determining whether worker task events are consistent with the products being stored in a first stocking location or in a second stocking location on the sales floor.

In one embodiment, a system for determining stocking locations of products having more than one stocking location on a sales floor of a retail facility includes an electronic inventory management database configured to store product identification data indicating an identity of at least one product at the retail facility and product location data indicating a stocking location of the at least one product on the sales floor of the retail facility and an electronic inventory management device including a processor-based control circuit. The control circuit is configured to: correlate the product identification data and the product location data stored in the electronic inventory management database; determine, based on the correlating step, that the at least one product is stored at least in a first stocking location and a second stocking location on the sales floor of the retail facility; track, based on the determining step, at least one worker task event associated with the at least one product; detect, based on the tracking step, that the at least one worker task event is not consistent with the at least one product being stocked or having been stocked at the first stocking location; and determine, based on the detecting step, that the at least one product is to be stocked or was stocked in the second stocking location.

In another embodiment, a method of determining stocking locations of products having more than one stocking location on a sales floor of a retail facility includes: storing, in an electronic inventory management database, product identification data indicating an identity of at least one product at the retail facility and product location data indicating a stocking location of the at least one product on the sales floor of the retail facility; correlating, via an electronic inventory management device including a processor-based control circuit, the product identification data and the product location data stored in the electronic inventory management database; determining, via the electronic inventory management device and based on the correlating step, that the at least one product is stored at least in a first stocking location and a second stocking location on the sales floor of the retail facility; tracking, via the electronic inventory management device and based on the determining step, at least one worker task event associated with the at least one product; detecting, via the electronic inventory management device and based on the tracking step, that the at least one worker task event is not consistent with the at least one product being stocked or having been stocked at the first stocking location; and determining, via the electronic inventory management device and based on the detecting step, that the at least one product is to be stocked or was stocked in the second stocking location.

The exemplary system 100 in FIG. 1 includes an electronic inventory management device 120 configured generally to manage the inventory of products 190 stocked on a sales floor 180 of a retail facility 110. Specifically, the electronic inventory management device 120 is configured to manage and/or store electronic data associated with the products 190 on the sales floor 180 of the retail facility 110, as well as worker tasks performed with respect to the products 190 at the retail facility 110. The electronic inventory management device 120 in FIG. 1 may be a stationary or portable electronic device, for example, a desktop computer, a laptop computer, a tablet, a mobile phone, or any other electronic device including a processor-based control unit (i.e., control circuit) and configured for data entry and one-way or two-way communication (e.g., over a network 150) with another device located at the retail facility 110 (e.g., scanning device 130), or with another device at a location remote to the retail facility 110 (e.g., a remote server configured for communication with the electronic inventory management device 120 at the retail facility 110).

The network 150 may be a wide-area network (WAN), a local area network (LAN), a personal area network (PAN), a wireless local area network (WLAN), or any other wired or wireless internet or intranet network, or combinations of such networks. Communication between various electronic devices of system 100 may take place over hard-wired, cellular, Wi-Fi or Bluetooth networked components, or the like. In some embodiments, one or more electronic devices of system 100 may include cloud-based features, such as cloud-based memory storage.

In the embodiment shown in FIG. 1, the system 100 includes an electronic scanning device 130 in two-way communication with the electronic inventory management device 120 over the network 150. In some embodiments, the electronic scanning device 130 may be an electronic (e.g., hand-held) scanner that may be used by workers at the retail facility 110 to scan the products 190 when stocking the products 190 onto their respective stocking locations on the sales floor 180. In some embodiments, the electronic scanning device 130 may be an electronic (e.g., hand-held) scanner coupled to a point of sale register and which may be used by workers at the retail facility 110 to scan the products 190 when the products 190 are being purchased by customers at the retail facility 110.

In some embodiments, the electronic scanning device 130 is configured to scan one or more products 190 at the retail facility 110, and more specifically, to scan one or more product identifying indicia 192 present on the products 190 or on the packaging of the products 190. In some embodiments, the electronic scanning device 130 is configured to scan one or more stocking location identifiers 165, 175 associated with the first and second stocking locations 160, 170 on the sales floor 180 of the retail facility 110. In some embodiments, the electronic scanning device 130 in configured to transmit electronic data over the network 150 to the electronic inventory management device 120 in response to a worker at the retail facility 110 scanning one or more stocking location identifiers 165, 175 or scanning one or more products 190 when the worker is stocking such products 190 onto a first stocking location 160 or onto a second stocking location 170 on the sales floor 180 of the retail facility 110, or scanning one or more products 190 using the electronic scanning device 130 when the worker is processing a sale of such products 190 at a point of sale register on the sales floor 180 of the retail facility 110.

Exemplary electronic scanning devices 130 may include, but are not limited to barcode (e.g., UPC, EAN, GTIN12, GTIN 13, or the like) readers, quick response (QR) code readers, radio frequency identification (RFID) readers, stock keeping unit (SKU) readers, near field communication (NFC) readers, video capture-enabled devices (e.g., cameras, smartwatches, glasses, or the like) electronic tablets, cellular phones, or the like mobile electronic devices. In some embodiments, the first stocking location identifier 165 and the second stocking location identifier 175 may include but are not limited to labels (e.g., including a barcode, RFID, or the like) attached or otherwise coupled to the first and second stocking locations 160 and 170. In one approach, the electronic scanning device 130 may be a stationary electronic scanning device installed on the sales floor 180 of the retail facility 110 and configured to scan identifying indicia 192 of products 190 stocked in the first stocking location 160 and second stocking location 170. In the embodiment illustrated in FIG. 1, the electronic scanning device 130 may obtain electronic data associated with the scanned product

190 by communicating via a communication channel 135 (e.g., radio waves) with a unique identifying indicia 192 (e.g., label, tag, barcode, RFID, SKU, or the like) on an exterior or interior of the product 190 or on an exterior or interior of the packaging of the product 190.

With reference to FIG. 1, the exemplary electronic inventory management device 120 is coupled via the network 150 to an electronic inventory management database 140 configured to store electronic information associated with the products 190 stocked at the retail facility 110 as well as electronic information associated with the worker tasks performed or scheduled to be performed by the workers with respect to the products 190 at the retail facility 110. While in the exemplary system 100 of FIG. 1, the electronic inventory management database 140 is illustrated as a separate device, it will be appreciated that the electronic inventory management device 120 and the electronic inventory management device 120 may be incorporated into one electronic device in some embodiments. The electronic inventory management database 140 may be stored, for example, on non-volatile storage media (e.g., a hard drive, flash drive, or removable optical disk) external or internal relative to the electronic inventory management device 120, or external or internal relative to computing devices separate from the electronic inventory management device 120. In some embodiments, as described in more detail below, the electronic inventory management database 140 may store electronic data including but not limited to product identification data indicating an identity of products 190 at the retail facility 110, product location data indicating a stocking location (e.g., first stocking location 160 and/or second stocking location 170 of the product 190) of the products 190 on the sales floor 180 of the retail facility 110, and stocking location capacity data indicating a total number of units of a product 190 that may be stocked in any given stocking location (e.g., first stocking location 160 and/or second stocking location 170 of the product 190) on the sales floor 180 of the retail facility 110.

In some embodiments, the product identification data and the product location data associated with the products 190 is received by and stored in the electronic inventory management database 140, for example, as a result of a task performed by a worker at a retail facility 110 with respect to one or more products 190. For example, in some embodiments, product identification data may be generated and transmitted via the network 150 to the electronic inventory management database 140 (directly or via the electronic inventory management device 120) when a worker at a retail facility 110 scans identifying indicia 192 of a product 190 using the electronic scanning device 130 when performing the task of stocking the product 190 onto the first (e.g., primary) stocking location 160 or onto the second (e.g., secondary) stocking location 170 of the product 190 on the sales floor 180.

In some embodiments, product location data may be generated and transmitted via the network 150 to the electronic inventory management database 140 (directly or via the electronic inventory management device 120) when a worker at a retail facility 110 scans a stocking location identifier 165 associated with the first stocking location 160 or a stocking location identifier 175 associated with the second stocking location 170 using the electronic scanning device 130 when performing the task of stocking the product 190 onto the first stocking location 160 or onto the secondary stocking location of the product 190 on the sales floor 180. In one approach, the product identification data and the product location data are stored in the electronic inventory management database 140 such that product identification data for a product 190 stocked on the sales floor 180 of the retail facility 110 is associated with product location data generated when the product was placed onto its stocking location (e.g., first stocking location 160 or second stocking location 170) on the sales floor 180 of the retail facility 110. In other words, the electronic inventory management database 140 associates product identification data and product location data for a given product to enable the electronic inventory management device 120, upon accessing the electronic inventory management database 140 over the network 150, to determine a precise stocking location of each product 190 on the sales floor 180 of the retail facility 110.

Figure 2:
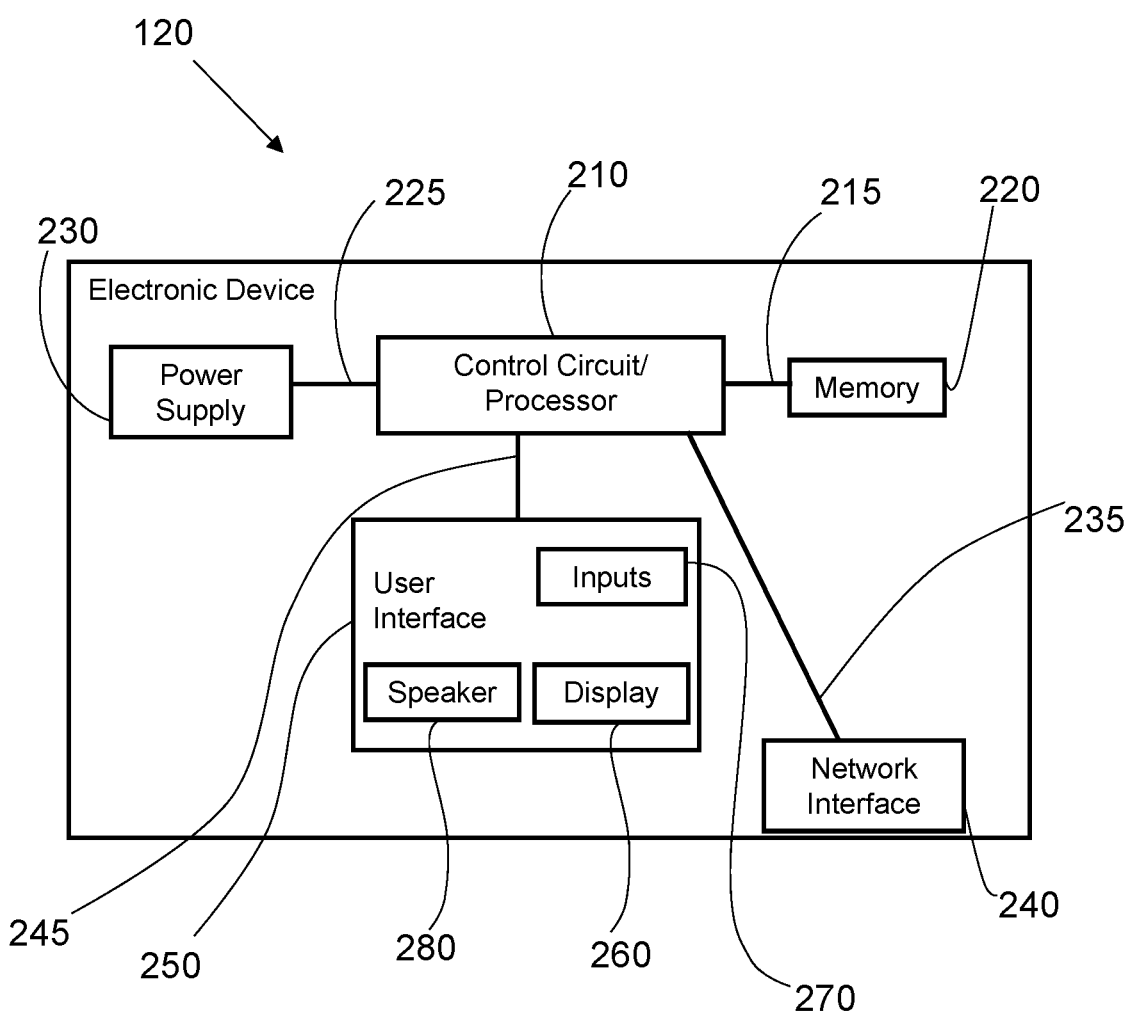
FIG. 2 is a functional block diagram of an electronic inventory management device in accordance with some embodiments.

An exemplary electronic inventory management device 120 depicted in FIG. 2 is a computer-based device and includes a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, an application specification integrated circuit, a field programmable gate array, and so on. These architectural options are well known and understood in the art and require no further description.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory 220 and/or the control circuit 210 may be referred to as a non-transitory medium or non-transitory computer readable medium.

In the embodiment illustrated in FIG. 2, the control circuit 210 is also electrically coupled via a connection 235 to a network interface 240 that can receive signals from and transmit signals such as commands, information from the electronic inventory management database 140, and other electronic data via a wireless or wired connection to electronic devices local to the retail facility 110, or one or more servers remote to the retail facility 110. The network may be a wide-area network (WAN), a local area network (LAN), a personal area network (PAN) or any other sized network. The network 150 may enable one or more electronic devices to communicate via the Internet and may include cloud-based features, such as cloud-based memory storage. Generally, the communications over the network 150 may take place over hard-wired, cellular, Wi-Fi or Bluetooth networked components or the like.

Optionally, instead of receiving information associated with the products 190 located in the first (i.e., primary) stocking location 160 and the second (i.e., secondary) stocking location 170 from a separate scanner such as the electronic scanning device 130, the control circuit 210 of the electronic inventory management device 120 may be configured for communication over the network 150 with a sensor such as a scanner/reader installed at the first stocking location 160 and/or the second stocking location 170 and configured to detect and/or read product identity data on the identifying indicia 192 of products 190 located and the first and second stocking locations 160, 170, and to transmit such product identity data over the network 150 to the electronic inventory management database 140 (directly on via the electronic inventory management device 120). Such an optional reader may include, but is not limited to an RFID reader, optical reader, barcode reader, or the like.

In the embodiment shown in FIG. 2, the processor-based control circuit 210 of the electronic inventory management device 120 is electrically coupled via a connection 245 to a user interface 250, which may include a visual display or display screen 260 (e.g., LED screen) and/or inputs 270 (e.g., button input) that provide the user interface 250 with the ability to permit a user such as a worker at the retail facility 110 to manually control the electronic inventory management device 120 by inputting commands, for example, via touch-screen and/or button operation or voice. The display screen 260 of the electronic inventory management device 120 can also permit the user to see menus, options, worker tasks, and/or alerts displayed by the electronic inventory management device 120. The user interface 250 of the electronic inventory management device 120 may also include a speaker 280 that provides audible feedback (e.g., alerts) to the user.

As discussed in more detail below, in some embodiments, the electronic inventory management device 120 is configured to receive electronic data indicating that one or more products 190 are being sold at a point of sale register on the sales floor 180 of the retail facility 110 or are being stocked onto the first stocking location 160 or onto the second stocking location 170 of the products 190 on the sales floor 180 of the retail facility 110. In some embodiments, the control circuit 210 is programmed to perform various functions associated with determining, based on tracking worker tasks of workers at the retail facility 110, whether a product 190 is to be or was previously stocked at the first stocking location 160, or if this product 190 is to be or was previously stocked at the second stocking location 170.

In some embodiments, the control circuit 210 of the electronic inventory management device 120 is programmed to obtain electronic data from a point of sale register on the sales floor 180 of the retail facility 110 as a result of a worker scanning identifying indicia 192 of a product 190 during a sale of the product 190 to a customer. Such electronic data may be transmitted from the electronic inventory management device 120 to the electronic inventory management database 140 over the network 150, such that product identification and/or product location data in the electronic inventory management database 140 is updated to reflect removal of the sold product 190 from its stocking location (e.g., first stocking location 160 or second stocking location 170) on the sales floor 180. It will be appreciated that such electronic data may be transmitted from a point of sale register over the network 150 directly to the electronic inventory management database 140 without being transmitted via the electronic inventory management device 120. In some embodiments, the control circuit 210 of the electronic inventory management device 120 is configured to access the electronic inventory management database 140 and to retrieve from the electronic inventory management database 140 electronic data representing storage capacity of a stocking location (e.g., shelf) on the sales floor 180 of the retail facility 110 in order to facilitate a determination by the control circuit 210 of whether the product 190 scanned at a point of sale register during a sale of the product 190 to a customer was taken by the customer from the first stocking location 160 or from the second stocking location 170.

In some embodiments, the control circuit 210 of the electronic inventory management device 120 is configured to correlate the product identification data and the product location data stored in the electronic inventory management database 140 and, based on that correlation, to determine that one or more products 190 on the sales floor 180 of the retail facility 110 are not just stocked in one stocking location, but are instead stocked in a first stocking location 160 and a second stocking location 170 on the sales floor 180. For example, product location data retrieved from the electronic inventory management database 140 by the electronic inventory management device 120 may indicate that both the first stocking location 160 and the second stocking location 170 stock units of one product 190, since all units of a product 190 have the same product identity data (e.g., UPC code and/or serial number) stored in the electronic inventory management database 140. In other words, in some embodiments, the control circuit 210 is programmed to correlate product identity data and product location data stored in electronic inventory management database 140 to determine whether and how many items stocked in the first stocking location 160 and second stocking location 170 represent units of the same products 190. This correlation of information obtained from the electronic inventory management database 140 enables the control circuit 210 to determine that units of certain products 190 are stored in more than one stocking location on the sales floor 180 (e.g., on a shelf in an aisle and on a feature display near entrance).

In some embodiments, upon a determination that a product 190 is or was stocked in more than one stocking location on the sales floor 180 of the retail facility 110, the control circuit 210 of the electronic inventory management device 120 is configured to output an appropriate visual or audible indication. In one approach, the control circuit 210 of the electronic inventory management device 120 is configured to generate an audible alarm (e.g., via the speaker 280 of the electronic inventory management device 120) indicating that a product 190 is or was stocked in more than one stocking location on the sales floor 180. In another approach, the control circuit 210 of the electronic inventory management device 120 is configured to generate a visible alarm (e.g., via the display 260 of the electronic inventory management device 120) indicating that a product 190 is or was stocked in more than one stocking location on the sales floor 180. In some embodiments, upon a determination that a product 190 is or was stocked in more than one stocking location on the sales floor 180 of the retail facility 110, the control circuit 210 of the electronic inventory management device 120 is configured to transmit a signal to the electronic inventory management database 140 to update the on-hand inventory in the electronic inventory management database 140 to associate additional data with the stored product identity data to indicate that a product 190 associated with this product identity data is a multiple location item, i.e., an item that is stocked in more than one stocking location on the sales floor 180 of the retail facility 110.

In some embodiments, the control circuit 210 of the electronic inventory management device 120 is configured to track worker task events associated with products 190 at the retail facility 110. In one approach, each time a worker scans identifying indicia 192 of a product 190 at the retail facility 110 using the electronic scanning device 130, the electronic scanning device 130 transmits a signal via the network 150 to the electronic inventory management device 120 and/or to the electronic inventory management database 140 reflecting the scan of the identifying indicia 192 of a given product 190 by the worker. In another approach, each time a worker scans a stocking location identifier 165, 175 associated with the first or second stocking location 160, 170, on the sales floor 180 at the retail facility 110 using the electronic scanning device 130, the electronic scanning device 130 transmits a signal via the network 150 to the electronic inventory management device 120 and/or to the electronic inventory management database 140 reflecting the scan of the stocking location identifier 165, 175 by the worker. As such, the electronic inventory management database 140 stores, and the control circuit 210 of the electronic inventory management device 120 tracks, all worker tasks performed by workers relative to all products 190 stocked on the sales floor 180 and/or sold at the retail facility 110.

In some embodiments, the control circuit 210 of the electronic inventory management device 120 is configured to detect, based on the tracking of all worker tasks performed by workers relative to all products 190 stocked on the sales floor 180 and/or sold at the retail facility 110, that one or more worker task events are not consistent with certain products 190 being stocked or having been stocked at the first stocking location 160 or at the second stocking location 170. As mentioned above, the electronic inventory management database 140 is configured to store shelf capacity data indicating a maximum shelf capacity for units of the products 190 at each one of the first and second stocking locations 160, 170. In some embodiments, the shelf capacity data stored in the electronic inventory management database 140 is retrieved by the electronic inventory management device 120 and factored in the detection, by the control circuit 210 of the electronic inventory management device 120, that a worker task performed with respect to a given product 190 at the retail facility 110 is not consistent with the product 190 being stocked at the first stocking location 160, supporting a determination, based on this detection, that this product 190 is or was stocked at the second stocking location 170.

For example, when a worker task event received at the electronic inventory management database 140 and/or the electronic inventory management device 120 is one of many scans of units of a product 190 at a point of sale register during a sale of the product 190 to one or more customers at the retail facility 110, the control circuit 210 of the electronic inventory management device 120 is programmed to detect whether a total number of units of the products 190 scanned at the point of sale register exceeds the maximum shelf capacity for the products 190 at the first stocking location 160. For example, if the control circuit 210 of the electronic inventory management device 120 obtains electronic data indicating that 40 units of a product 190 were sold at one or more point of sale registers on the sales floor 180 of the retail facility, the control circuit 210 is programmed to obtain storage capacity data associated with the first stocking location 160 of the product 190 from the electronic inventory management database 140, and upon a determination by the control circuit 210 that the first stocking location 160 has a maximum shelf capacity of 30 units of the product 190, the control circuit 210 can detect and determine that the sales of the product 190 are inconsistent with all 40 sold units of the product 190 being stocked at the first stocking location 160, thereby supporting a determination that at least some of the sold units of the product 190 were taken by customers from the second stocking location 170.

By the same token, in some embodiments, the control circuit 210 of the electronic inventory management device 120 is programmed to determine that the total number of units of a product 190 scanned at one or more point of sale registers on the sales floor 180 during a sale of the product 190 to one or more customers at the retail facility 110 does not exceed the maximum shelf capacity for the product 190 at the second stocking location 170. For example, in one approach, following a determination by the control circuit 210 that 10 out of 40 units of the product 190 that were sold at the retail facility 110 could not have been taken were taken by customers from the first stocking location 160 (which has a maximum shelf capacity of 30 units), the control circuit 210 is programmed to obtain storage capacity data associated with the second stocking location 170 of the product 190 from the electronic inventory management database 140, and upon a determination by the control circuit 210 that the second stocking location 170 has a maximum shelf capacity of 20 units of the product 190, the control circuit 210 can determine that these 10 units of the product 190 are not inconsistent with the maximum storage capacity of the second stocking location 170, which supports a determination that these 10 units of the product 190 sold at the retail facility 110 were taken by customers from the second stocking location 170. Of course, if the second stocking location is indicated in the electronic inventory management database 140 with a maximum storage capacity of 5 units of the product 190, the control circuit 210 can determine that these 10 units of the product 190 are inconsistent with the maximum storage capacity of the second stocking location 170, supporting a determination that some of these 10 units of the product 190 sold at the retail facility 110 were taken by customers from a third stocking location 170.

In some embodiments, the control circuit 210 of the electronic inventory management device 120 is programmed to generate a restocking request for one or more products 190 at the first stocking location 160 and/or at the second stocking location 170 upon a determination by the control circuit 210 that the first stocking location 160 and/or the second stocking location 170 is depleted of units of product 190 due to sales to customers, and needs to be restocked with additional units of the product 190. In one approach, the control circuit 210 is programmed to generate the restocking request and to cause the electronic inventory management device 120 to transmit the restocking request from the electronic inventory management device 120 over the network 150 to an electronic scanning device 130 of a worker at the retail facility 110. In some embodiments, such a restocking request, when received at the electronic scanning device 130 of the worker, generates an alert to the worker to replenish the first stocking location 160 and/or the second stocking location 170 with additional units of the product 190, which may be retrieved by the worker, for example, from the stock room of the retail facility 110.

When a worker at the retail facility 110 is stocking the first stocking location 160 with additional units of a product 190 to replenish the units of the product 190 sold to customers and scans a certain number of units of the product 190 using the electronic scanning device 130, the control circuit 210 of the electronic inventory management device 120, which is configured to track the worker tasks, is configured to determine whether a total number of units of the product 190 designated by the worker's scan for stocking onto the first stocking location 160 is inconsistent with the maximum shelf capacity of the first stocking location 160. In some embodiments, to make this determination, the control circuit 210 does not need to know the exact number of units of the product 190 that can be stocked, were stocked, or are currently stocked at the second stocking location 170. For example, the worker who arrives at the first stocking location 160 with a certain number of units of the product 190 may notice that the first stocking location 160 is full and does not need to be replenished with additional units of the product 190. If the worker does not know that additional units of this product 190 are stocked in a second stocking location 170 on the sales floor 180, the worker will then return the replenishment units of the product 190 that were brought by the worker onto the sales floor 180 to the stock room at the retail facility 110 to be re-binned into the storage bins where they were previously stored. After the worker scans these replenishment units of the product 190 using the electronic scanning device 130 during the re-binning by the worker, the control unit 210 of the electronic inventory management device 120 is programmed to interpret the re-binning of these replenishment units of the product 190 as an indication that a second stocking location 170 for this product 190 is present on the sales floor 180, since the initial restocking request that caused the worker to bring out the replenishment units of the product 190 onto the sale floor 180 was based on concrete sales of a certain number of units of the product 190 to customers at the retail facility 110. After the control circuit 210 determines that the product 190 is stocked on the sales floor 180 not only at the first stocking location 160, but also in the second stocking location 170, the control circuit 210 is programmed to cause the electronic inventory management device 120 to send a signal to the electronic inventory management database 140 including information indicating that the product 190 is stocked both at the first stocking location 160 and at the second stocking location 170. After receipt of this signal from the electronic inventory management device 120, the electronic inventory management database 140 stores this information in association with the product 190. Thus, any worker who subsequently goes out onto the sales floor to replenish units of a product 190 will be notified (e.g., via a signal sent from the electronic inventory management database 140 to the worker's electronic scanning device 130) that the product 190 is stocked in a first stocking location 160 and in a second stocking location 170 on the sales floor 180. This way, if the worker arrives at the first stocking location 160 with a certain number of units of the product 190 and notices that the first stocking location 160 is full, the worker can then go to the second stocking location 170 to properly stock the replenishment units of the product 190 there instead of returning to the stock room.

In some embodiments, the control circuit 210 is programmed to determine the exact number of units of the product 190 that can be stocked at the second stocking location 170. For example, if 20 units of a product 190 are known to have been sold at the retail facility 110 and the electronic inventory management device 120 tracks a worker task involving scans of 20 units of a product 190 for the purpose of stocking these 20 units of the product on the first stocking location 160, the control circuit 210 is programmed to obtain the maximum storage capacity of the first stocking location 160 (e.g., by retrieving this information from the electronic inventory management database 140) and to determine that the worker task of stocking 20 units of the product 190 on the first stocking location 160 is inconsistent with the storage capacity of the first stocking location 160, since the first stocking location 160 has a maximum storage capacity of 10 units of the product 190. Such a determination by the control circuit 210 would support a further determination by the control circuit 210 that 10 of the 20 units of the product 190 were taken by customers from the second stocking location 170. In some embodiments, the control circuit 210 would then generate a restocking request for 10 additional units of the product 190 at the second stocking location 170.

With reference to FIGS. 1-3, one method 300 of operation of the system 100 for determining stocking locations of products 190 having more than one stocking location on a sales floor 180 of a retail facility 110 will now be described. The method 300 is described in the context of the system of FIG. 1 by way of example only. It will be appreciated that embodiments of the method 300 may be implemented not only in the system 100, but in other systems.

The exemplary method 300 shown in FIG. 3 includes storing, in an electronic inventory management database 140, product identification data indicating an identity of one or more products 190 at the retail facility 110 and product location data indicating a stocking location 160, 170 of the products 190 on the sales floor 180 of the retail facility 110 (step 310). For example, in some embodiments, the electronic inventory management database 140 records and stores the identity (e.g., serial number, UPC code, or the like) of every product 190 stocked at the retail facility 110 and records and stores the stocking location (e.g., stocking location identifiers 165, 175) associated with every product 190 at the retail facility 110. As discussed above, in some embodiments, the electronic inventory management database 140 receives product identity data as a result of a worker scanning identifying indicia 192 of a product 190 using the worker's electronic scanning device 130 when stocking the product 190 at the first stocking location 160 or second stocking location 170. In some embodiments, the electronic inventory management database 140 receives product identity data as a result of a worker scanning identifying indicia 192 of a product 190 using a point of sale device when a customer is purchasing the product 190 at the retail facility 110. In some embodiments, the electronic inventory management database 140 receives product location data as a result of a worker scanning a stocking location identifier 165, 175 using the worker's electronic scanning device 130 when stocking the product 190 at the first stocking location 160 or second stocking location 170.

As discussed above, in some embodiments, when stocking products 190 onto their respective first and/or second stocking locations 160, 170, the worker scans the identifying indicia 192 on the product 190 using the electronic scanning device 130 for the purpose of associating the scanned product 190 in the electronic inventory management database 140 with the condition of being stocked at the first or second stocking location 160, 170. The identifying indicia 192 of the product 190 may be a passive identifier such as a quick response (QR) code, bar code (e.g., UPC, GTIN12, EAN, GTIN13, or the like), passive RFID tag, or the like, or may be an active identifier such as an NFC tag, active RFID tag, or the like. Such scanning of the identifying indicia 192 of the product 190 by the electronic scanning device 130 during stocking by the worker results in the electronic scanning device 130 transmitting electronic data representing the scanned identifying indicia 192 of the product 190 via the network 150 to the electronic inventory management database 140 (directly, or via the electronic inventory management device 120) for storage and association with the product location data associated with the product 190.

The exemplary method 300 of FIG. 3 also includes correlating, via the control circuit 210 of the electronic inventory management device 120, the product identification data and the product location data stored in the electronic inventory management database 140 (step 320). As explained above and shown in FIG. 3, this correlating step by the control circuit 210 results in the step of determining, by the control circuit 210 that one or more products 190 are stored in more than one stocking location (i.e., at least at the first stocking location 160 and at the second stocking location 170) on the sales floor 180 of the retail facility 110 (step 330). In some embodiments, the product identification data and product location data are associated in the electronic inventory management database 140 to enable the electronic inventory management device 120, upon accessing the electronic inventory management database 140 over the network 150, to determine a precise stocking location of each product 190 on the sales floor 180 of the retail facility 110.

The exemplary method 300 of FIG. 3 further includes tracking, via the electronic inventory management device 120 and based on the above-discussed determining step, one or more worker task events associated with one or more products 190 at the retail facility 110 (step 340). As explained above, in some embodiments, worker task events performed by workers at the retail facility 110 in relation to the products 190 involve a scan of the identifying indicia 192 of the product 190, for example, a scan by the electronic scanning device 130 during the stocking of the product 190 onto the first stocking location 160 or second stocking location 170, or a scan by a point of sale register during a sale of the product 190 to the customer. In either event, the scan generated during the worker task is transmitted in some embodiments to the electronic inventory management database 140 over the network 150 (either directly or via the electronic inventory management device 120) and stored in the electronic inventory management database 140. In some embodiments, the electronic inventory management device 120 accesses the electronic inventory management database 140 over the network 150 to retrieve worker task events stored on the electronic inventory management database 140, thereby facilitating a determination by the control circuit 210 of the electronic inventory management device 120 as to whether a product 190 is to be or was stocked at the first stocking location 160 or is to be or was stocked at the second stocking location 170 on the sales floor 180 of the retail facility 110.

The exemplary method 300 of FIG. 3 further includes detecting, via the electronic inventory management device 120 and based on the above-described tracking by the control circuit 210 of the electronic inventory management device 120, that one or more worker task events are not consistent with one or more products 190 being stocked or having been stocked at the first stocking location 160 (step 350). As a corollary to the detecting step, the method 300 of FIG. 3 also includes determining, via the electronic inventory management device 120, that such a product 190 is to be stocked or was stocked in the second stocking location 170 on the sales floor 180 of the retail facility 110. As described above, after the control circuit 210 determines that the product 190 is stocked on the sales floor 180 not only at the first stocking location 160, but also in the second stocking location 170, the method 300 may include sending a signal from the electronic inventory management device 120 to the electronic inventory management database 140, the signal including information indicating that the product 190 is stocked both at the first stocking location 160 and at the second stocking location 170. In addition, the method 300 may include storing such information received from the electronic inventory management device 120 in the electronic inventory management database 140 in association with the product 190. The method 300 may also include sending a signal from the electronic inventory management database 140 to the worker's electronic scanning device 130, the signal indicating that a product 190 scanned by the worker using the electronic scanning device 130 is stocked in a first stocking location 160 and in a second stocking location 170 on the sales floor 180.

The systems and methods described herein analyze product identification data, product location data, and worker tasks associated with the products at a retail facility to determine whether units of a product sold at the retail facility are displayed on the sales floor of the retail facility in more than one stocking location, and to estimate whether units of the product were taken by the customers from the first stocking location or from the second stocking location. The methods and systems described herein significantly increase the efficiency of workers at the retail facility by determining which stocking locations on the sales floor need restocking due to sales to customers and then directing the workers to replenish stocking locations on the sales floor which actually need restocking, reducing unnecessary trips by workers to a stocking location only to see this stocking location is at full shelf capacity. Accordingly, the methods and systems described herein provide for efficient inventory management that gets replenishment products to their needed locations quicker, thereby potentially increasing profits for the retail sales facility.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for determining stocking locations of products having more than one stocking location on a sales floor of a retail facility, the system comprising:
   a plurality of product identifiers, each of the product identifiers being attached to or coupled to a respective one of the products on the sales floor of a retail facility;
   a plurality of stocking location identifiers, each of the stocking location identifiers being coupled to a respective one of the stocking location on the sales floor of the retail facility;
   an electronic inventory management database configured to store product identification data indicating an identity of at least one product at the retail facility and product location data indicating a stocking location of the at least one product on the sales floor of the retail facility;
   an electronic scanning device including at least one sensor configured to scan the product identifiers of the products and the stocking location identifiers coupled to the stocking locations, the electronic scanning device being configured to:
      generate product identification data based on a scan of a product identifier via the at least one sensor, and transmit the generated product identification data to the electronic inventory management database for storage;
      generate product location data based on a scan of the stocking location identifier via the at least one sensor, and transmit the generated product location data to the electronic inventory management database for storage; and an electronic inventory management device including a processor-based control circuit, the control circuit being configured to:
- correlate the product identification data and the product location data stored in the electronic inventory management database;
- determine, based on the correlating step, that the at least one product is stored at least in a first stocking location and a second stocking location on the sales floor of the retail facility;
- track, based on the determining step, at least one worker task event associated with the at least one product;
- detect, based on the tracking step, that the at least one worker task event is not consistent with the at least one product being stocked or having been stocked at the first stocking location;
- determine, based on the detecting step, that the at least one product is to be stocked or was stocked in the second stocking location; and
- output, based on a determination that the at least one product is to be stocked or was stocked in the second stocking location, a visual or audible indication of the determination that that the at least one product is to be stocked or was stocked in the second stocking location.

2. The system of claim 1, wherein the control circuit is further configured to output, based on a determination that the at least one product is to be stocked or was stocked in the second stocking location, a visual or audible indication of the determination that the at least one product is to be stocked or was stocked in the second stocking location.

3. The system of claim 1, wherein the electronic inventory management database is configured to receive the product identification data via a worker at the retail facility scanning a product identifier using an electronic scanning device and to receive the product location data via the worker at the retail facility scanning a stocking location identifier on the sales floor of the retail facility using the electronic scanning device.

4. The system of claim 1, wherein the electronic inventory management database is configured to store shelf capacity data indicating a maximum shelf capacity for the at least one product at each one of the first and second stocking locations.

5. The system of claim 1, wherein the at least one worker task event is a scan of the at least one product during at least one sale of the at least product to at least one consumer at the retail facility, and wherein the control circuit is further configured to detect that a total number of units of the at least one product scanned during the at least one sale of the at least one product to the at least one consumer exceeds the maximum shelf capacity for the at least one product at the first stocking location.

6. The system of claim 5, wherein the control circuit is further configured to determine that the total number of units of the at least one product scanned during the at least one sale of the at least one product to the at least one consumer does not exceed the maximum shelf capacity for the at least one product at the second stocking location, and to determine that the units of the at least one product scanned during the at least one sale of the at least one product to the at least one consumer were picked by the at least one consumer from the second stocking location.

7. The system of claim 1, wherein the control circuit is further configured to generate a restocking request for the at least one product at the second stocking locations, and to cause the electronic inventory management device to transmit the restocking request from the electronic inventory management device to an electronic scanning device of a worker at the retail facility.

8. The system of claim 4, wherein the at least one worker task event is a scan of the at least one product during a stocking of the at least product onto at least one shelf in at least one of the at least two stocking locations, and wherein the control circuit is further configured to detect that a total number of units of the at least one product scanned for stocking onto the at least one shelf in the first stocking location is inconsistent with the maximum shelf capacity of the at least one shelf at the first stocking location.

9. The system of claim 8, wherein the control circuit is further configured to determine that the total number of units of the at least one product scanned for stocking onto the at least one shelf at the second stocking location is consistent with the maximum shelf capacity of at least one shelf at the second stocking location.

10. The system of claim 9, wherein the control circuit is further configured to generate a restocking request for the at least one product at the second stocking location, and to cause the electronic inventory management device to transmit the restocking request to an electronic scanning device of a worker at the retail facility.

11. A method of determining stocking locations of products having more than one stocking location on a sales floor of a retail facility, the method comprising:
- providing a plurality of product identifiers, each of the product identifiers being attached to or coupled to a respective one of the products on the sales floor of a retail facility;
- providing a plurality of stocking location identifiers, each of the stocking location identifiers being coupled to a respective one of the stocking location on the sales floor of the retail facility;
- storing, in an electronic inventory management database, product identification data indicating an identity of at least one product at the retail facility and product location data indicating a stocking location of the at least one product on the sales floor of the retail facility;
- providing an electronic scanning device including at least one sensor configured to scan the product identifiers of the products and the stocking location identifiers coupled to the stocking locations;
- generating, via the electronic scanning device, product identification data based on a scan of a product identifier via the at least one sensor;
- transmitting, via the electronic scanning device, the generated product identification data to the electronic inventory management database for storage;
- generating, via the electronic scanning device, product location data based on a scan of the stocking location identifier via the at least one sensor;
- transmitting, via the electronic scanning device, the generated product location data to the electronic inventory management database for storage;
- correlating, via an electronic inventory management device including a processor-based control circuit, the product identification data and the product location data stored in the electronic inventory management database;
- determining, via the electronic inventory management device and based on the correlating step, that the at least one product is stored at least in a first stocking location and a second stocking location on the sales floor of the retail facility;

tracking, via the electronic inventory management device and based on the determining step, at least one worker task event associated with the at least one product;

detecting, via the electronic inventory management device and based on the tracking step, that the at least one worker task event is not consistent with the at least one product being stocked or having been stocked at the first stocking location;

determining, via the electronic inventory management device and based on the detecting step, that the at least one product is to be stocked or was stocked in the second stocking location; and outputting, via the electronic inventory management device and based on a determination that the at least one product is to be stocked or was stocked in the second stocking location, a visual or audible indication of the determination that that the at least one product is to be stocked or was stocked in the second stocking location.

12. The method of claim 11, further comprising outputting, via the electronic inventory management device, based on the determining that the at least one product is to be stocked or was stocked in the second stocking location, a visual or audible indication of the determination that the at least one product is located in the second stocking location.

13. The method of claim 11, wherein the storing step further comprises receiving the product identification data via a worker at the retail facility scanning a product identifier using an electronic scanning device and receiving the product location data via the worker at the retail facility scanning a stocking location identifier on the sales floor of the retail facility using the electronic scanning device.

14. The method of claim 11, wherein the storing step further comprises storing, in the electronic inventory management database, shelf capacity data indicating a maximum shelf capacity for the at least one product at each one of the first and second stocking locations.

15. The method of claim 14, wherein the at least one worker task event is a scan of the at least one product during at least one sale of the at least product to at least one consumer at the retail facility, and wherein the detecting step further comprises detecting, via the electronic inventory management device, that a total number of units of the at least one product scanned during the at least one sale of the at least one product to the at least one consumer exceeds the maximum shelf capacity for the at least one product at the first stocking location.

16. The method of claim 15, wherein the determining step further comprises determining that the total number of units of the at least one product scanned during the at least one sale of the at least one product to the at least one consumer does not exceed the maximum shelf capacity for the at least one product at the second stocking location, and determining that the units of the at least one product scanned during the at least one sale of the at least one product to the at least one consumer were picked by the at least one consumer from the second stocking location.

17. The method of claim 16, further comprising, generating, via the electronic inventory management device, a restocking request for the at least one product at the second stocking locations, and transmitting the restocking request from the electronic inventory management device to an electronic scanning device of a worker at the retail facility.

18. The method of claim 14, wherein the at least one worker task event is a scan of the at least one product during a stocking of the at least product onto at least one shelf in at least one of the at least two stocking locations, and wherein the detecting step further comprises, detecting, via the electronic inventory management device, that a total number of units of the at least one product scanned for stocking onto the at least one shelf in the first stocking location is inconsistent with the maximum shelf capacity of the at least one shelf at the first stocking location.

19. The method of claim 18, wherein the determining step further comprises determining that the total number of units of the at least one product scanned for stocking onto the at least one shelf at the second stocking location is consistent with the maximum shelf capacity of at least one shelf at the second stocking location.

20. The method of claim 19, further comprising, generating, via the electronic inventory management device, a restocking request for the at least one product at the second stocking location, and transmitting the restocking request to an electronic scanning device of a worker at the retail facility.

* * * * *

UNITED STATES PATENT AND TRADEMARK OFFICE
CERTIFICATE OF CORRECTION

| | | |
|---|---|---|
| PATENT NO. | : 10,535,039 B2 | Page 1 of 1 |
| APPLICATION NO. | : 15/678450 | |
| DATED | : January 14, 2020 | |
| INVENTOR(S) | : Nicholaus A Jones et al. | |

It is certified that error appears in the above-identified patent and that said Letters Patent is hereby corrected as shown below:

In the Claims

Column 15, Line 27, Claim 1, delete "that that" and insert -- that --, therefor.

Column 16, Line 10, Claim 8, insert -- one -- between "least" and "product", therefor.

Column 17, Line 20, Claim 11, delete "that that" and insert -- that --, therefor.

Signed and Sealed this
Twelfth Day of May, 2020

Andrei Iancu
*Director of the United States Patent and Trademark Office*